(12) United States Patent
Longmire et al.

(10) Patent No.: US 9,366,231 B2
(45) Date of Patent: Jun. 14, 2016

(54) FLUID APPARATUS WITH PITCH ADJUSTABLE VANES

(71) Applicants: Dean Russell Maier, Red Deer (CA); Wayne Olaf Martinson, Red Deer (CA); Sheryl Skaalerud, Leslieville (CA)

(72) Inventors: Andrew John Longmire, Leslieville (CA); Sheryl Skaalerud, Leslieville (CA); Dean Russell Maier, Red Deer (CA); Wayne Olaf Martinson, Red Deer (CA)

(73) Assignees: Dean Russell Maier, Red Deer (CA); Wayne Olaf Martinson, Red Deer (CA); Sheryl Skaalerud, Leslieville (CA)

( * ) Notice: Subject to any disclaimer, the term of this patent is extended or adjusted under 35 U.S.C. 154(b) by 656 days.

(21) Appl. No.: 13/691,498

(22) Filed: Nov. 30, 2012

(65) Prior Publication Data
US 2014/0147274 A1 May 29, 2014

(30) Foreign Application Priority Data
Nov. 29, 2012 (CA) .................................... 2798526

(51) Int. Cl.
*F03D 7/06* (2006.01)
(52) U.S. Cl.
CPC ............... *F03D 7/06* (2013.01); *F05B 2260/77* (2013.01)
(58) Field of Classification Search
CPC ............ F03D 3/067; F03D 3/068; F03D 7/06

USPC .............. 416/9, 17, 112, 113, 116, 44, 51, 52
See application file for complete search history.

(56) References Cited

U.S. PATENT DOCUMENTS

| 385,674 | A | | 7/1888 | Lockwood | |
|---|---|---|---|---|---|
| 809,431 | A | * | 1/1906 | Cutting | ........................... 416/52 |
| 4,186,313 | A | | 1/1980 | Wurtz | |
| 4,203,707 | A | * | 5/1980 | Stepp | ............................ 416/119 |

(Continued)

FOREIGN PATENT DOCUMENTS

CN    1074978 A    8/1993

OTHER PUBLICATIONS

"Vertical Axis Windmill Invention," Alternative Energy News, Apr. 26, 2007, <http://www.alternative-energy-news.info/vertical-axis-windmill> [retrieved on Jul. 24, 2012], 17 pages.

*Primary Examiner* — Richard Edgar
(74) *Attorney, Agent, or Firm* — Christensen O'Connor Johnson Kindness PLLC

(57) ABSTRACT

An apparatus comprising: a frame; a shaft mounted to the frame for rotation; plural vanes each mounted for rotation about a respective pitch adjustment axis on one or more respective arms extending from the shaft; a collar mounted to the frame coaxial with the shaft, the collar having a first outer circumferential surface defining a convex cam shape, and a second outer circumferential surface defining a non cam circular shape; and plural followers arranged to contact the first outer circumferential surface in a first configuration corresponding to a first speed of rotation of the shaft and the second outer circumferential surface in a second configuration corresponding to a second speed of rotation of the shaft, the second speed being higher than the first speed, the plural followers being each connected to adjust the pitch of a respective vane of the plural vanes.

13 Claims, 10 Drawing Sheets

(56) References Cited

U.S. PATENT DOCUMENTS

| | | | |
|---|---|---|---|
| 4,218,184 A | 8/1980 | McPherson | |
| 4,260,328 A * | 4/1981 | Hamel | 416/17 |
| 4,274,809 A | 6/1981 | Delgado | |
| 4,392,780 A | 7/1983 | Taft | |
| 4,507,049 A | 3/1985 | Strandgren | |
| 4,618,312 A | 10/1986 | Williams | |
| 4,764,090 A | 8/1988 | Danson | |
| 6,543,999 B1 * | 4/2003 | Polen | 416/17 |
| 7,413,404 B2 | 8/2008 | Chio | |
| 8,167,544 B2 | 5/2012 | Schiel | |

* cited by examiner

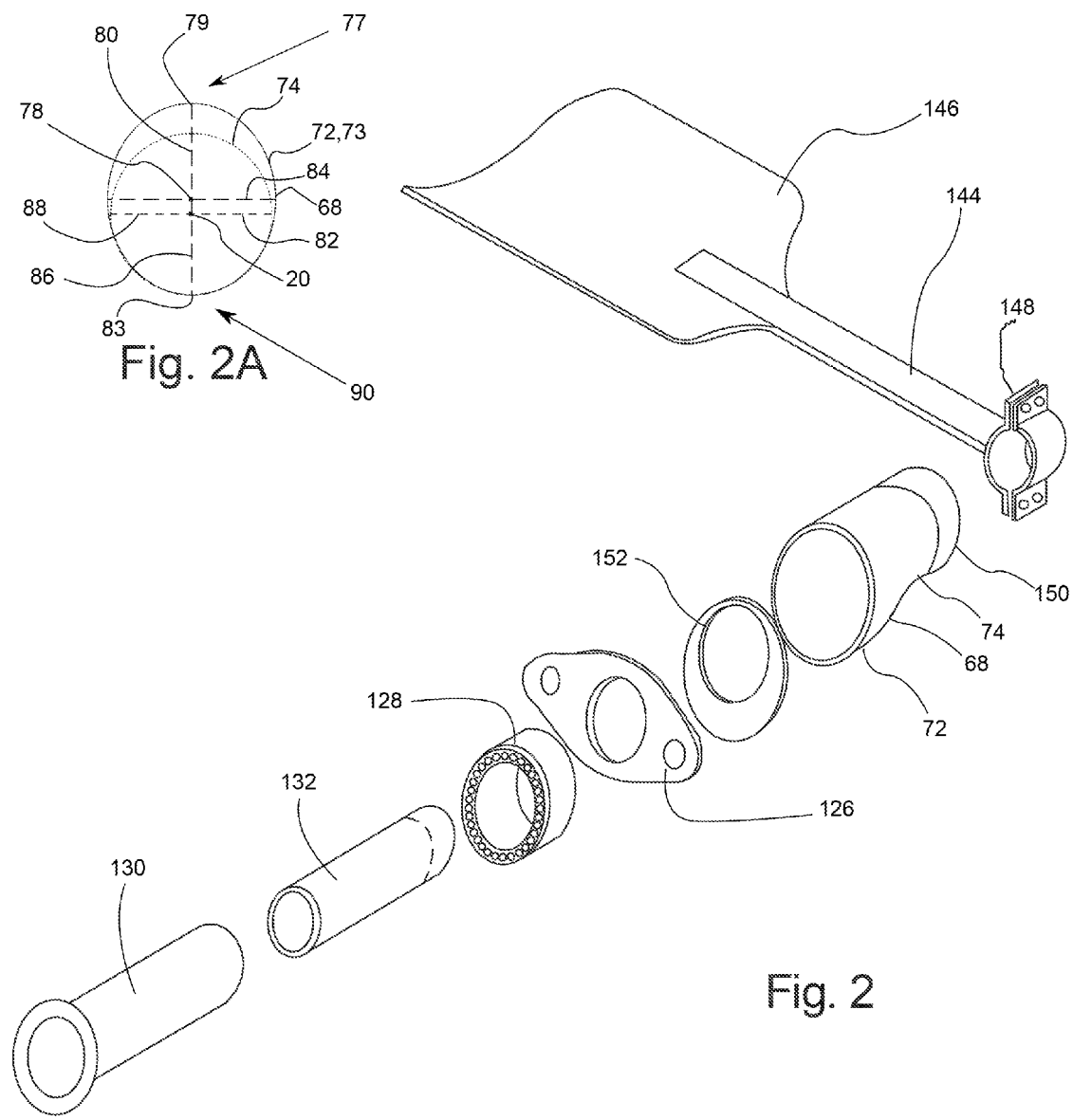

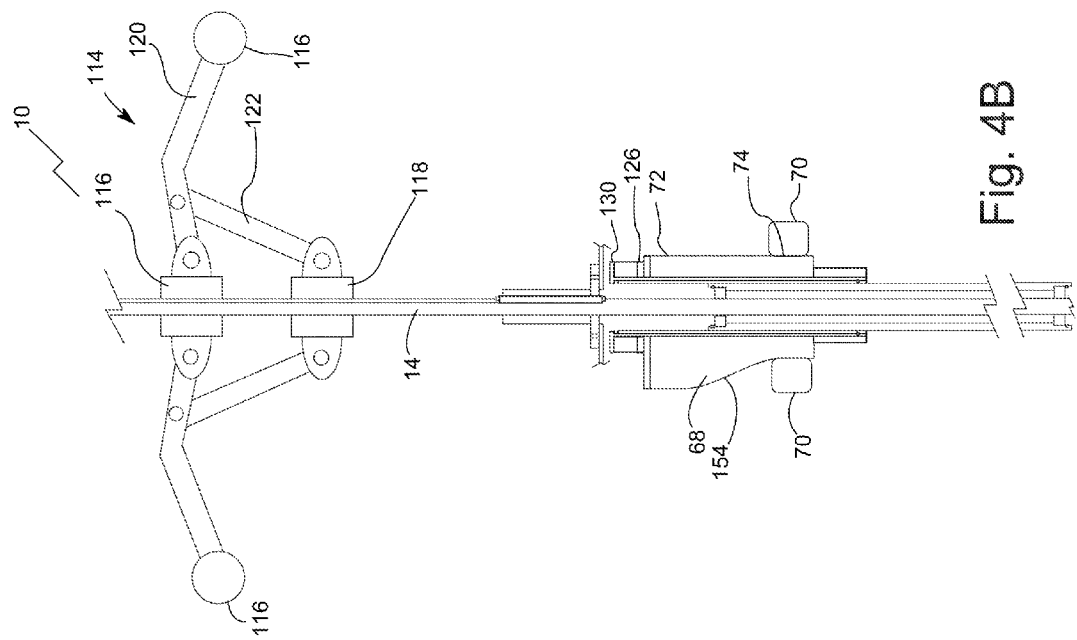
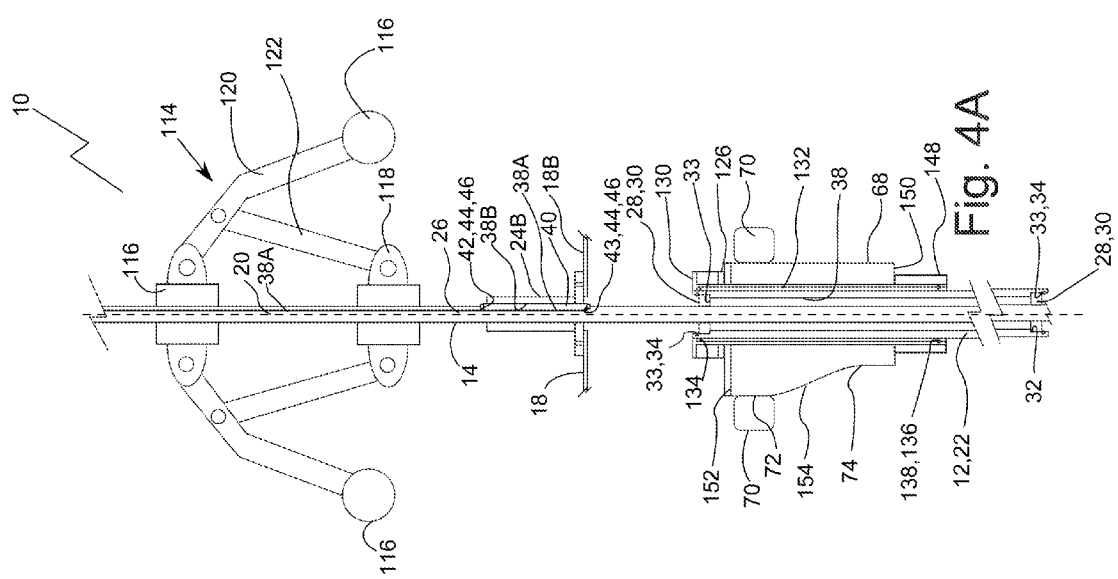

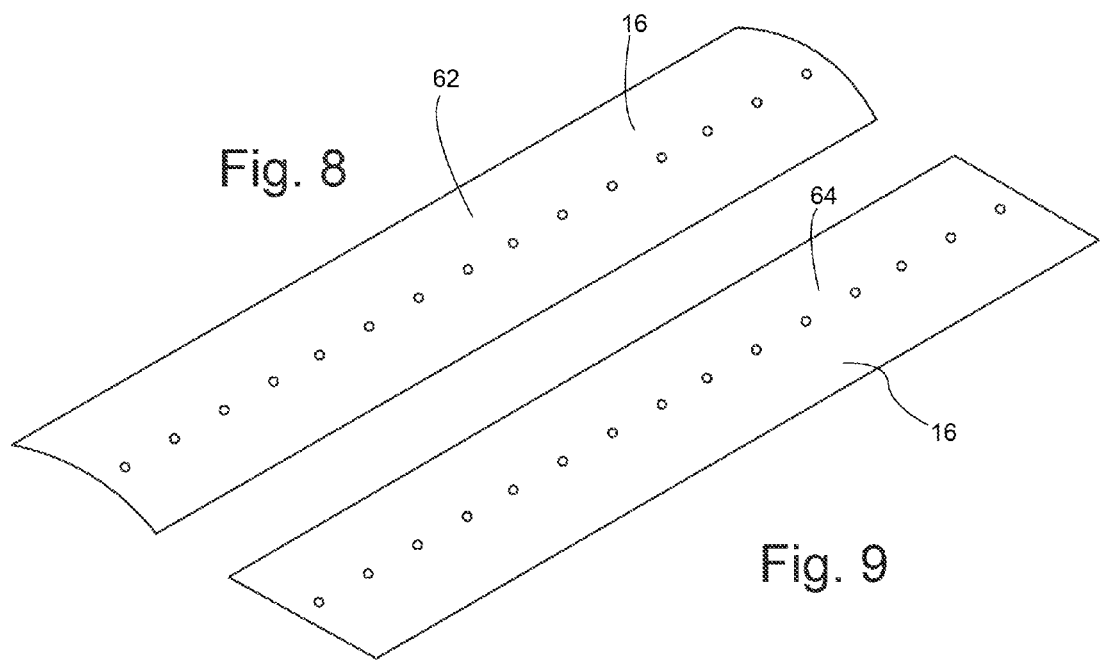
Fig. 8
Fig. 9
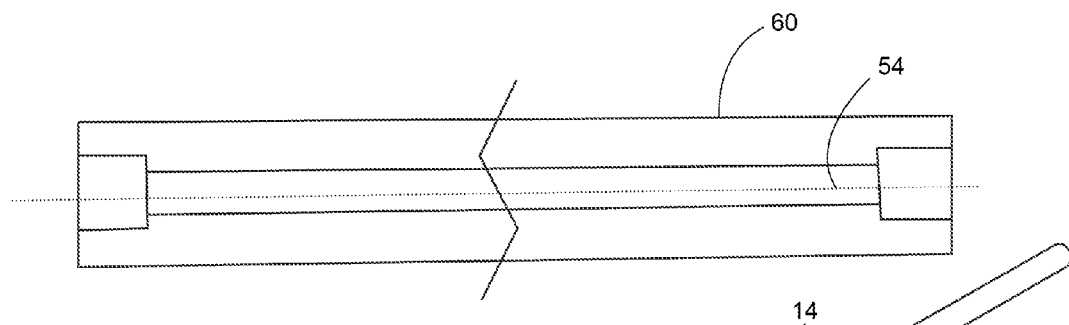
Fig. 10
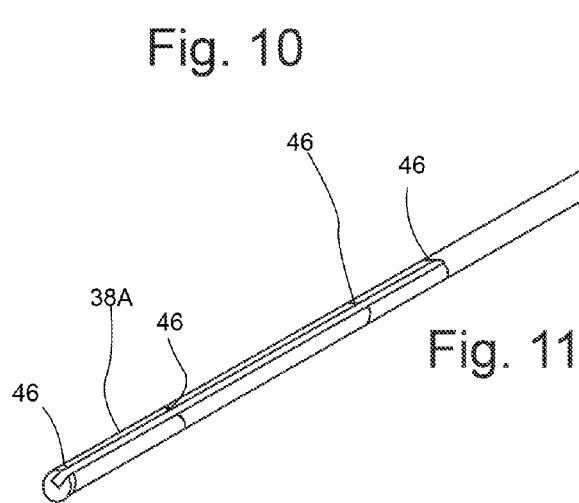
Fig. 11

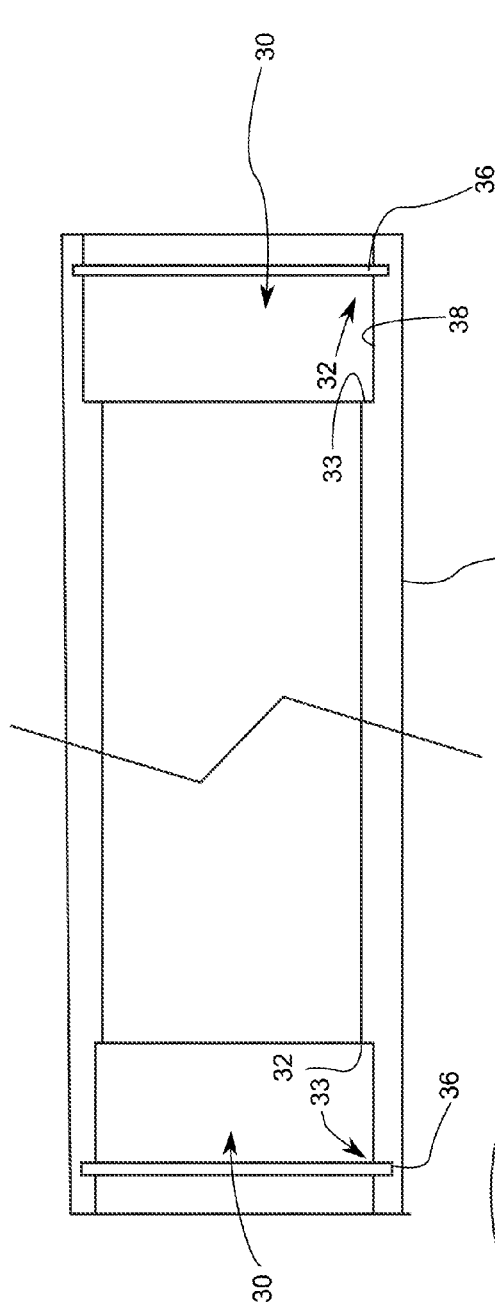
Fig. 15
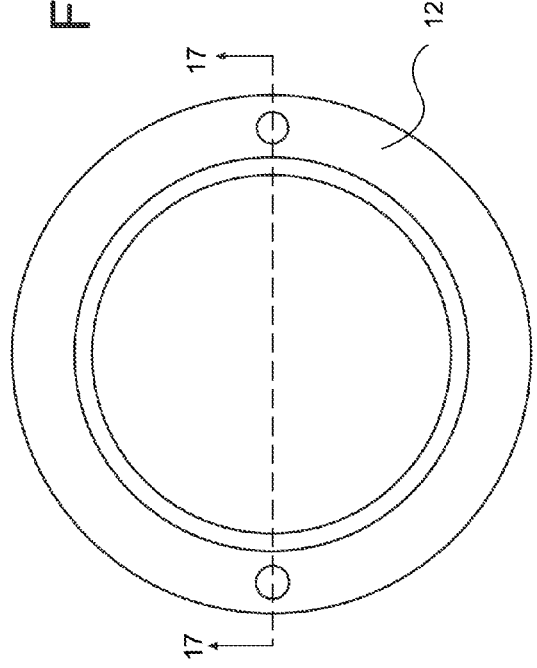
Fig. 16
Fig. 17

FLUID APPARATUS WITH PITCH ADJUSTABLE VANES

TECHNICAL FIELD

This document relates to fluid driven and fluid driving apparatuses with pitch adjustable vanes.

BACKGROUND

Wind mills exist that use a cam to adjust pitch vane throughout a full vane rotation cycle. Rollers contact the cam and connect to the vanes via levers. As the rollers follow the contour of the cam, the pitch of each vane is correspondingly adjusted throughout each vane rotation cycle. A breaking mechanism or governor may be used to prevent over speed.

SUMMARY

An apparatus is disclosed comprising: a frame; a shaft mounted to the frame for rotation; plural vanes each mounted for rotation about a respective pitch adjustment axis on one or more respective arms extending from the shaft; a collar mounted to the frame coaxial with the shaft, the collar having a first outer circumferential surface defining a convex cam shape, and a second outer circumferential surface defining a non cam circular shape; and plural followers arranged to contact the first outer circumferential surface in a first configuration corresponding to a first speed of rotation of the shaft and the second outer circumferential surface in a second configuration corresponding to a second speed of rotation of the shaft, the second speed being higher than the first speed, the plural followers being each connected to adjust the pitch of a respective vane of the plural vanes.

An apparatus is disclosed comprising: a frame; a shaft mounted to the frame for rotation; plural vanes each mounted for rotation about a respective pitch adjustment axis on one or more respective arms extending from the shaft, each vane of the plural vanes being moveable into and out of a neutral pitch, where an angle of attack of the vane is perpendicular to a direction of rotation of the vane about the frame; and a pitch adjuster connected to adjust the pitch of the plural vanes between a first configuration where each vane is out of neutral pitch during a portion of a full rotation of the shaft about the frame, and a second configuration where all of the plural vanes are in neutral pitch.

In various embodiments, there may be included any one or more of the following features: The plural followers comprise rollers. The apparatus has a fluid guidance connected to rotate the collar to orient the apparatus into a fluid flow direction. The first outer circumferential surface has a circular arc portion and an elliptical arc portion. The first outer circumferential surface is an ellipse. A shaft rotational axis is offset from an ellipse center along a major semi axis defined by the ellipse, the major semi axis being longer than a diameter of the second outer circumferential surface. A minor semi axis defined by the ellipse is equal to or longer than the diameter of the second outer circumferential surface, and a radius of the first outer circumferential surface along the major semi axis is equal to a radius of the second outer circumferential surface. The second outer circumferential surface has a smaller radius than an average radius of the first outer circumferential surface. The apparatus has a device for axially displacing the collar relative to the plural followers to switch between the first configuration and the second configuration. The first outer circumferential surface is above the second outer circumferential surface, and in which the controller further comprises one or more weights connected to raise the collar by centrifugal force when the shaft achieves the second speed of rotation. The first outer circumferential surface and the second outer circumferential surface are connected by a smooth surface transitioning between the first outer circumferential surface and the second outer circumferential surface. Each vane of the plural vanes is moveable into and out of a neutral pitch, where an angle of attack of the vane is perpendicular to a direction of rotation of the vane about the frame. The collar is shaped such that, when in the first configuration, each vane is out of neutral pitch for a portion of a full rotation of the shaft about the frame, and when in the second configuration all of the plural vanes are in neutral pitch. The pitch adjuster has a collar mounted to the frame and having a cam shape. The pitch adjuster has plural followers arranged to contact the collar and being each connected to adjust the pitch of a respective vane of the plural vanes relative to the fluid flow direction. The plural followers are arranged to contact a first outer circumferential surface, of the collar, that defines a convex cam shape when in the first configuration, and a second outer circumferential surface defining a circular shape when in the second configuration, the first configuration corresponding to a first speed of rotation of the shaft, the second configuration corresponding to a second speed of rotation of the shaft, and the second speed being higher than the first speed. The fluid guidance is connected to rotate the collar relative to the frame. The shaft has a vertical axis of rotation, and the apparatus is a wind mill.

These and other aspects of the device and method are set out in the claims, which are incorporated here by reference.

BRIEF DESCRIPTION OF THE FIGURES

Embodiments will now be described with reference to the figures, not drawn to scale, in which like reference characters denote like elements, by way of example, and in which:

FIG. 2 is a perspective exploded view of the components of the cam collar and wind guidance system from the wind mill of FIG. 1.

FIG. 2A is a section view of the cam collar of FIG. 2 showing the cam circumferential surface, and overlaid with the circular circumferential surfaces.

FIGS. 4A and 4B are side elevation views, in section, that illustrate the cam collar of the wind mill of FIG. 1 when operating in low and high speed winds, respectively.

FIGS. 8 and 9 are perspective views of the curved and flat sheets, respectively, that make up a vane of the wind mill of FIG. 1.

FIG. 10 is a side elevation section view of the vane shaft of the wind mill of FIG. 1.

FIG. 11 is a perspective view of the drive shaft of the wind mill of FIG. 1.

FIG. 15 is a side elevation section view of the mast of the wind mill of FIG. 1.

FIG. 16 is a top plan view of the cam bearing plate of the wind mill of FIG. 1.

FIG. 17 is a section view taken along the 17-17 section lines of FIG. 16.

DETAILED DESCRIPTION

Immaterial modifications may be made to the embodiments described here without departing from what is covered by the claims.

For many years, fluid apparatuses such as wind mills have been used to harness wind energy for a variety of purposes. Particularly, in the later part of the 19th century and the early part of the 20th century, wind mills gained favor for use in pumping water from wells and later for generating electricity. A great deal of interest in these devices existed around this time.

Due to technological innovations, wind mills declined in popularity in favor of fossil fuel based sources of energy. However, especially, in rural areas, use of wind mills continues to this day. Recently, with increased attention paid to the environmental problems associated with forms of energy that rely on fossil fuels, and with technological innovations associated with the use of renewable energy sources, attention again has returned to wind mills as a significant alternative source of energy.

Wind mills typically operate over a range of wind speeds, due to the fact that wind speed often changes depending on the environment the wind mill is positioned in. For example, it may be common for a location to have windy mornings and calm evenings. Having a wind mill that can handle a broad range of wind speed is thus beneficial as it improves the utility of the device. In many environments, natural wind speeds may exceed the upper end of the range of safe operating wind speeds of a wind mill. In such cases, it is beneficial to have a system in place to prevent rotational over speed to prevent damage to the wind mill. Some wind mills are designed only for high speed operation, however, such wind mills may thus not be usable in low speeds and often need to be kickstarted. Other wind mills use systems to keep rotational speed relatively constant in all wind speeds. Still other wind mills use different vane pitch adjustment patterns for high and low wind speeds.

Figure 1:
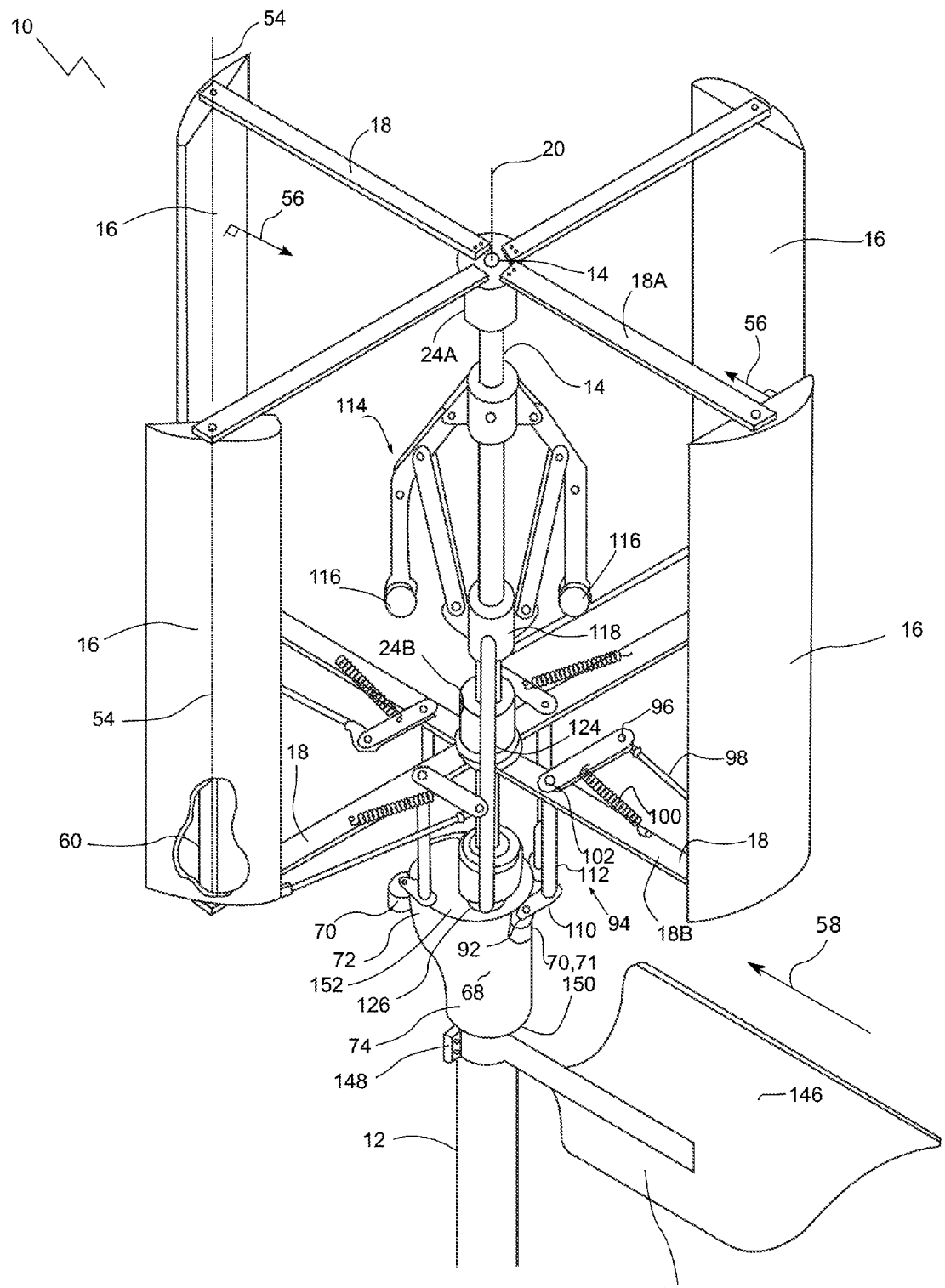
FIG. 1 is a perspective view of a wind mill operating at low speed.

Referring to FIGS. 1 and 4A, an apparatus 10, for example a wind mill as shown, is illustrated. Apparatus 10 has a frame 12, a shaft 14, plural vanes 16, and plural arms or spars 18.

Referring to FIGS. 1, 4A, and 15, frame 12 is stationary relative to shaft 14, and provides a structural base around which shaft 14 is mounted to rotate around. Frame 12 may rest on or be secured to a ground surface (not shown) or another suitable surface. As shown, frame 12 may include a mast 22, which may be cylindrical as shown (FIGS. 4A, 15). Mast 22 may be anchored to a base (not shown), and may incorporate lateral supports (not shown), such as guy lines (not shown) or other suitable supports.

Referring to FIGS. 1, 4A, 5-7, 11, shaft 14 may be at least partially cylindrical, or may have a solid core 26 at a shaft rotational axis 20 as shown (FIGS. 1, 4A). Shaft 14 may be mounted via one or more bearings 28, such as ball bearing assemblies as shown, within stationary frame 12 (FIG. 4A). Bearings 28 may sit within respective bearing recesses 30 defined within frame 12, and may centralize shaft 14 (FIG. 4A, 15). Recesses 30 may axially retain bearings 28 between upper and lower axially facing shoulders 32, 33, for example defined by the mast 22 or a retainer ring 34 fitted within an annular slot 36 in the inner surface 38 of mast 22. Shaft 14 need not be cylindrical or solid in some cases.

Figure 5:
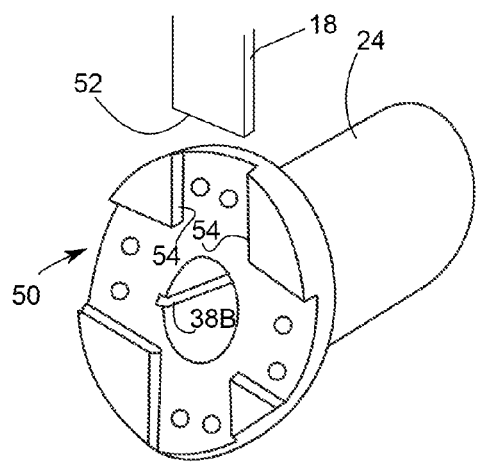
FIG. 5 is a perspective view of an arm hub of the wind mill of FIG. 1.
Figure 6:
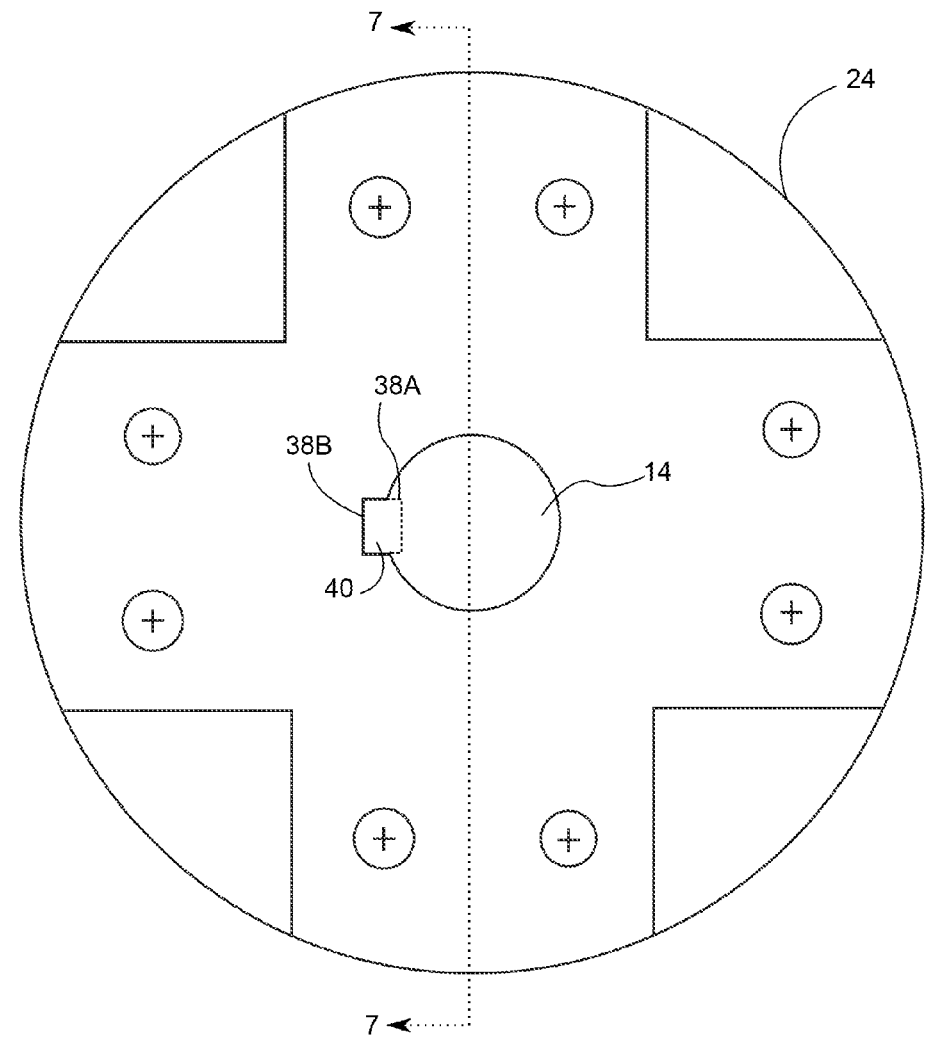
FIG. 6 is a top plan view of the arm hub of FIG. 5.
Figure 7:
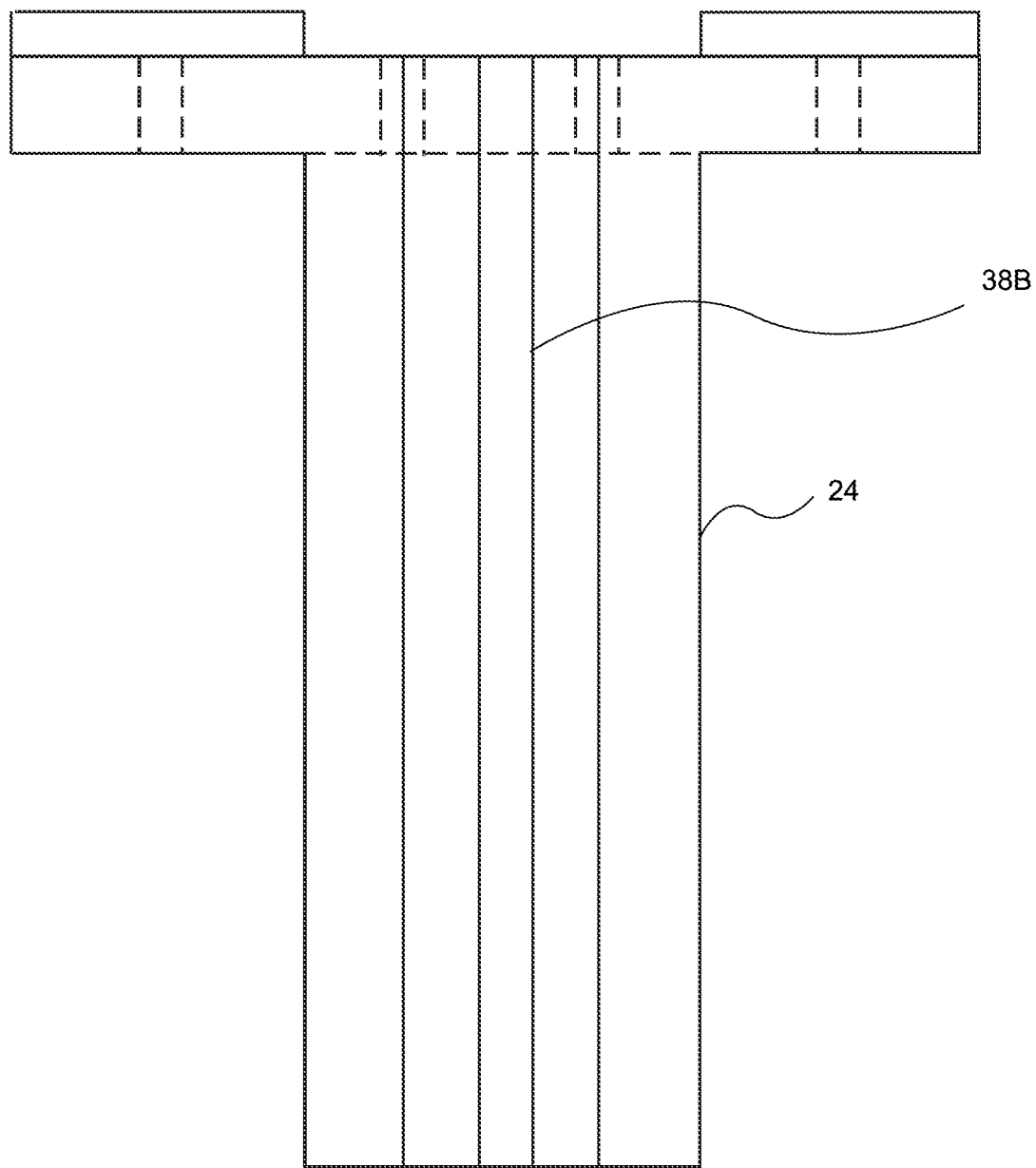
FIG. 7 is a section view taken along the 7-7 section lines of FIG. 6. Bolt holes are shown with dashed lines.
Figure 12:
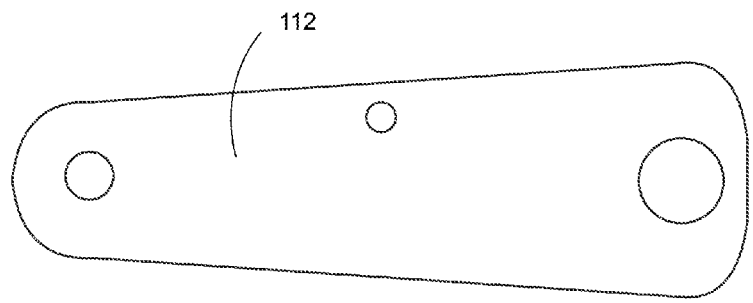
FIG. 12 is a top plan view of the lower lever of a cam follower of the wind mill of FIG. 1.
Figure 13:
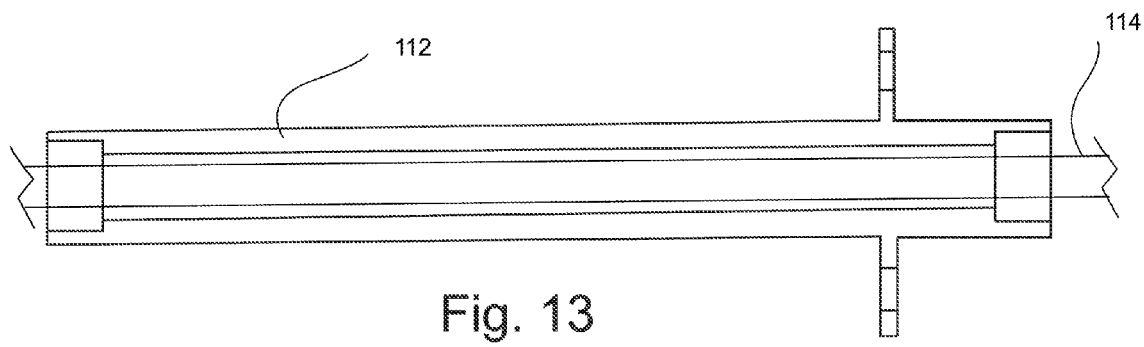
FIG. 13 is a side elevation section view of a support shaft of the wind mill of FIG. 1.

Referring to FIGS. 1, and 4A, plural arms 18 extend laterally from the shaft 14. Each vane 16 is mounted upon one or more respective arm 18, and in the example shown each vane 16 is mounted between an upper arm 18A and a lower arm 18B. Referring to FIGS. 1, 4A and 5-7, each arm 18 may extend from one or more arm hubs 24, such as top hub 24A and lower hub 24B. Hubs 24 may be connected at different axial positions along shaft 14. In order to ensure transmission of torque between hubs 24 and shaft 14, shaft 14 and hub 24 may be splined together. For example, both shaft 14 and hub 24 may be keyed to have corresponding respective lateral slots 38A and 38B, that axial extend along at least a portion of the axial length of hub 24 and shaft 14, and contain in use a spline 40 (FIGS. 4A, 5-7, 11). Like bearings 28, spline 40 may be contained between upper and lower axially facing shoulders 42, 43, for example defined by one or both of hub 24 and shaft 14 (FIG. 4A). In the example shown both shoulders 42 and 43 are defined by retainer rings 44, such as a split snap ring, that fit into respective annular slots 46 in an outer surface 48 of shaft 14 (FIGS. 4A, 6, 11). An arm axial end 50 of hub 24 may be axially indented to fit the ends 52 of arms 18 within lateral shoulders 54 (FIG. 5). End 50 may be flanged as shown to increase the surface area contact between each arm 18 and end 50.

Referring to FIGS. 1, 3A, and 8-10, each vane 16 is mounted for rotation to one or more arms 18 about a respective pitch adjustment axis 54. Axis 54 may be parallel to shaft axis 20 as shown, for example if axis 20 is a vertical axis of rotation. In the horizontal wind mill example of FIG. 1, pitch adjustment about axis 54 changes the vane angle of attack 56 relative to a fluid or wind flow direction 58 (FIG. 1). Horizontal wind mills have a lower profile when viewed into the wind, and thus provide less risk to birds than do comparable vertical wind mills. By making pitch adjustments of each vane 16 at different points in a full rotational cycle, the wind mill's response to wind speed may be tailored, for example increased or decreased as desired. Each vane 16 may have a suitable cross-sectional shape for example like that of an airplane wing (FIG. 3A), with a curved lift-generating side 62 (FIG. 8) and an opposed side 64, (FIG. 9) which may be planar and defines the vane angle of attack 56 (FIG. 3A), discussed further below. Side 64 is considered to be the active fluid catching side of vane 16 in the embodiment shown. Each vane 16 may be hollow and may contain one or more structural frame members such as vane shaft 60, which in this case defines the axis 54 (FIGS. 1 and 10). In some cases axis 54 may be angled relative to axis 20, even when shaft 14 has a vertical axis of rotation 20.

Referring to FIGS. 1, 2, 3A-B, and 4A, apparatus 10 may have a pitch adjuster such as a collar 68 for adjusting the pitch of each vane depending on the radial position of the vane in a full rotation cycle. Collar 68 may be mounted to the frame 12 coaxial with the shaft rotation axis 20. Collar 68 may have a cam shape and plural followers 70 (FIGS. 1, 3A-B, 4A) arranged to contact the collar 68 and being each connected to adjust the pitch of a respective vane 16 of the plural vanes relative to the wind flow direction 58. For example, the collar 68 may have a first outer circumferential surface 72, and a second outer circumferential surface 74 (FIGS. 1, 2, 2A, 3A-B, 4A). Outer circumferential surfaces 72 and 74 may be defined in axially displaced respective planes defined perpendicular to shaft axis 20. First surface 72 may define a convex cam shape, while second surface 74 may define a non cam shape, such as a circular, fixed radius shape as shown. The convexity of surface 72 refers to the fact that no line drawn perpendicular to shaft axis 20 through surface 72 will contact surface 72 more than twice. This helps provide followers 70 with a smoother ride around collar 68, creating less vibration than would be created if collar 68 had dips and sharp humps. Collar 68 may have a hambone look as shown.

Figure 3A:
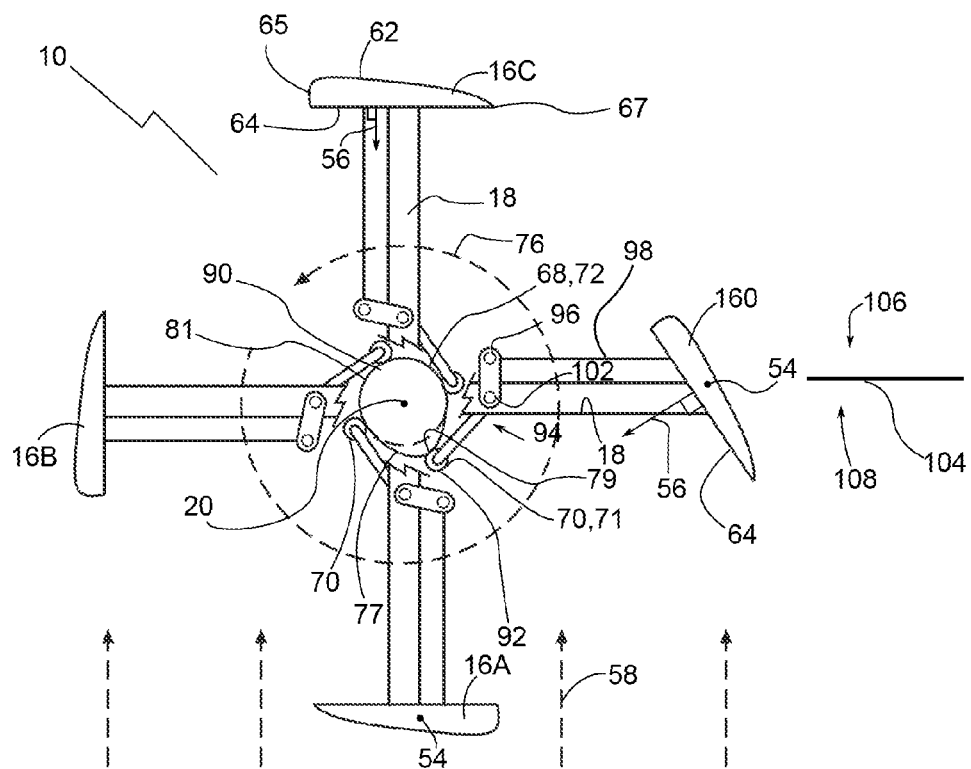
FIGS. 3A and 3B are top plan views, in section, that illustrate the vane pitch arrangement of the wind mill of FIG. 1 when operating in low and high speed winds, respectively.
Figure 3B:
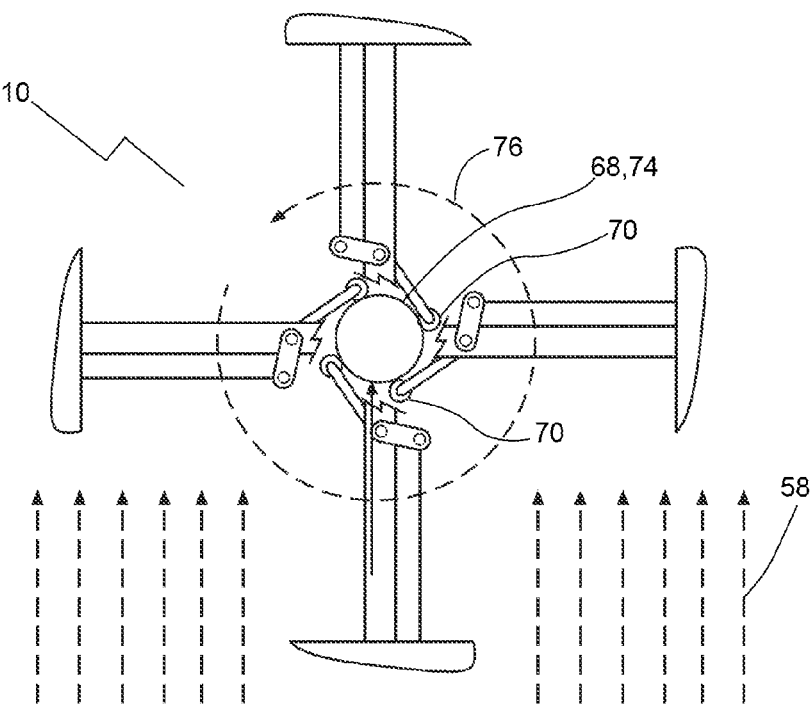

Referring to FIGS. 3A-B and 4A-B, followers 70 may be arranged to contact the first outer circumferential surface 72 in a first configuration corresponding to a first speed of rotation of the shaft 14. Followers 70 may also be arranged to contact the second outer circumferential surface 74 in a second configuration corresponding to a second speed of rotation of the shaft, with the second speed being higher than the first speed. The plural followers 70 are each connected, as will be explained further below, to adjust the pitch of a respective vane 16. Because each follower 70, which may include rollers 71, traverses the entire circumference of surfaces 72 or 74 once in a full vane rotation cycle, vane pitch is adjusted depending on the radial location of the follower 70 in the cycle. Thus, in the example shown, at low speeds the followers 70 ride the cammed portion 77 of the collar 68, and thus pitch adjust vanes 16 when moving from shorter to longer or longer to shorter radii of collar 68 (FIGS. 3A and 4A). Radii in this document refer to the distance between shaft axis 20 and surfaces 72 or 74, unless otherwise indicated. Similarly, at high wind speeds the followers 70 ride the non-cammed portion 90 of collar 68, and thus each vane 16 assumes the same pitch relative to the direction of vane rotation 76 throughout the entire rotation cycle (FIGS. 3B and 4B). Each vane 16 may have more than one follower 70 in some cases.

Referring to FIGS. 3A-B, in some cases each vane 16 of the plural vanes is moveable into and out of a neutral pitch about the pitch adjustment axis 54. In FIG. 3A, neutral pitch is assumed by vanes 16A, 16B, and 16C, but not vane 16D, whereas in FIG. 3B, neutral pitch is assumed by all vanes 16. When in neutral pitch, an angle of attack 56 of the vane 16 is perpendicular to a direction of rotation 76 of the vane 16 about the frame 12. If side 64 is not planar, the angle of attack 56 may refer to the average angle of attack, or another suitable angle. The vane angle of attack 56 as defined from side 64 is not the traditional angle of attack of an airplane wing, which generally refers to the angle of attack of the leading edge of the airplane wing. Because vane 16 has an airplane wing shape in cross section, leading edge 65 points into the direction of vane rotation 76, and trailing edge 67 points against the direction of vane rotation 76, when in neutral pitch. The pitch adjuster or collar 68 adjusts the pitch of the plural vanes 16 between the first configuration and the second configuration. In the first configuration (FIG. 3A) each vane 16, for example vane 16D in the example shown, is out of neutral pitch during a portion of a full rotation of the shaft 14 about the frame 12. In the second configuration (FIG. 3B) all of the plural vanes 16 are in neutral pitch.

Neutral pitch may represent a pitch where the vane 16 is fully feathered, for example perpendicular, to the direction of rotation 76. Holding neutral pitch throughout a full rotation cycle is advantageous at high wind speeds, because the active side 64 of each vane 16 is parallel to the wind flow direction 58 thus minimizing torque application upon vanes 16 by wind flow. However, at low wind speeds, it is advantageous to pitch adjust one or more vanes 16 each cycle to increase or maximize torque application from the wind. For example, the collar 68 is arranged so that each vane 16 is out of neutral pitch at least when the direction of vane rotation 76 of the vane 16 is the same as fluid flow direction 58. In fact, in the example shown the cam arc portion 77 of surface 72 has a smooth transition of increasing radius until reaching the pinnacle or longest radius portion 79 of the arc 77 when the vane 16D is in the position shown, with a smooth transition of decreasing radius until reaching the circular arc portion 81 of surface 72 (FIG. 3A). Thus, as the vane 16D moves from the position occupied by vane 16A in FIG. 3A, the vane pitches a greater degree from neutral until reaching maximum pitch at the position occupied by vane 16D. As the vane 16D moves into the position occupied by vane 16C the vane pitches less and less until reaching neutral pitch in the position occupied by vane 16C. It is at the pinnacle 79 in the rotation cycle that maximum torque from wind flow can be imparted upon a pitched vane 16D. In some cases the angle of attack of vane 16D relative to the direction of rotation 76 at the position shown will be up to 180 degrees, so that surface 64 of vane 16D faces directly into the wind 58.

Referring to FIGS. 2, 2A, 3A, and 4A, collar 68 may have a suitable shape in order to impart camming action upon followers 70. For example, the first outer circumferential surface 72 may be an ellipse 73 (FIG. 2A). The ellipse 73 may be oriented such that shaft rotational axis 20 is offset from an ellipse center 78 along a major semi axis 80 defined by the ellipse 73. The major semi axis 80 may be longer than a diameter 82 of the second outer circumferential surface 74, so that an end 83 of ellipse 73 defined along the major semi axis 80 opposite pinnacle 79 is close or equal to in radius length from axis 20 of surface 74. A minor semi axis 84 defined by the ellipse 73 may be equal to or longer than the diameter 82 of the second outer circumferential surface 74, to give surfaces 72 and 74 similar radial dimensions along minor semi axis 84. A radius 86 of the first outer circumferential surface 72 along the major semi axis 80 may be equal to a radius 88 of the second outer circumferential surface 74. All ellipse radii discussed herein are also defined from shaft axis 20 unless specifically indicated otherwise. By making radius 86 and 88 equal as shown, and providing minor semi axis 84 equal to or greater than diameter 82, a first arc portion 90 of surface 72 roughly conforms to the shape and radial dimensions as surface 74, while cammed arc portion 77 of surface 72 extends with longer relative average radii from surface 74. In some cases the second outer circumferential surface 72 may have a smaller radius 88 than an average radius of the first outer circumferential surface 72.

Referring to FIG. 3A first arc portion 90 may be a circular arc portion as shown, and cammed arc portion 77 may be an elliptical arc portion as shown. The elliptical arc portion may have a larger average radius than the circular arc portion as shown. The circular arc portion and the elliptical arc portion may also meet at tangents flush to one another, to ensure a smooth reduced vibration transition from portion 90 to 77 and back to 90. The cammed arc portion 77 may be sized such that at most only the respective follower 70 of one vane, in this case vane 16D contacts portion 77 at a time when in the first configuration.

Figure 14:
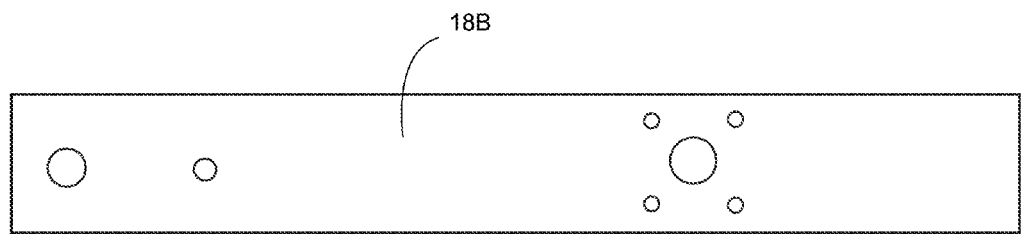
FIG. 14 is a top plan view of the bottom arm of the wind mill of FIG. 1.

Referring to FIGS. 1, 3A, 10, and 12-14, each follower 70 may connect to a respective vane 16 via a suitable connection. In the example shown, rollers 71 are mounted for rotation to a first end 92 of a lever assembly 94 (FIGS. 1 and 3A). A second end 96 of assembly 94 pivotally connects to a pitch guide arm 98, which itself pivotally connects to the vane 16 to pitch shift the vane 16. A bias mechanism such as a spring 100 is mounted to bias follower 72 against collar 68 (FIG. 1). Assembly 94 is connected at an intermediate pivot point 102 to arm 18. In the example shown, because assembly 94 pivots relative to a plane 104 defined through axis 20 and arm 18, with second end 96 extending on one side 106 of the plane and first end 92 extending on a second side 108 of the plane 104, as rotation speed increases the centrifugal pull through pivot point 102 from second end 96 acts to further bias roller 71 into collar 68, to prevent rollers 71 from disengaging roller 68 at high speeds. Lever assembly 94 is shown as including a first end lever 110 (FIG. 1), a pivot shaft 114 retained within a support shaft 112 parallel to axis 20 and defining the intermediate pivot point 102 (FIGS. 1 and 13), a second end lever 112 (FIGS. 1 and 12), and pitch guide arm 98 (FIG. 1). Arm 18B mounts the lever assembly 94 and support shaft 112 (FIGS. 1 and 14). Other suitable assemblies 94 used to transmit pitch shifting energy from followers 70 to vanes 16 may be used, including rack and pinion, sprocket and chain, belt, magnetic, solenoid, and pulley mechanisms.

Referring to FIGS. 1, 2, 4A and 4B, the first outer circumferential surface 72 may be axially displaced, for example above, the second outer circumferential surface 74. A device such as a centrifugal lift assembly 114 may be provided for axially displacing the collar 68 relative to the plural followers 70 to switch between the first configuration and the second configuration (FIGS. 1, 4A, and 4B). The assembly 114 may comprise one or more weights 116 connected to raise the collar 68 by centrifugal force when the shaft 14 achieves and exceeds the second speed of rotation. In the example shown assembly 114 has a top hub 116 axially fixed to shaft 14, and a lower hub 118 mounted to slide axially along shaft 14 (FIGS. 4A-B). Each weight 116 is supported by a lever 120 pivotally connected to top hub 116. Another lever 122 pivotally connects at one end to lower hub 118 and at another end to lever 120 intermediate of weight 116 and top hub 116. As rotational speed increases, weights 116 pivot upwards against gravity, drawing levers 122 and bottom hub 118 upwards in the process. Axial arms 124 connect between lower hub 118 and a lift plate 126 to transmit axial displacement to collar 68 (FIG. 1). A controller (not shown) may also be used to axially displace or adjust collar 68. The controller may be an electronic device connected for example through hydraulic piston to displace collar 68. One or more of a wind sensor or rotational speed sensor may be used to send signals to the controller, which adjusts axial collar displacement according to a table of wind speeds and corresponding axial displacement values.

Figure 18:
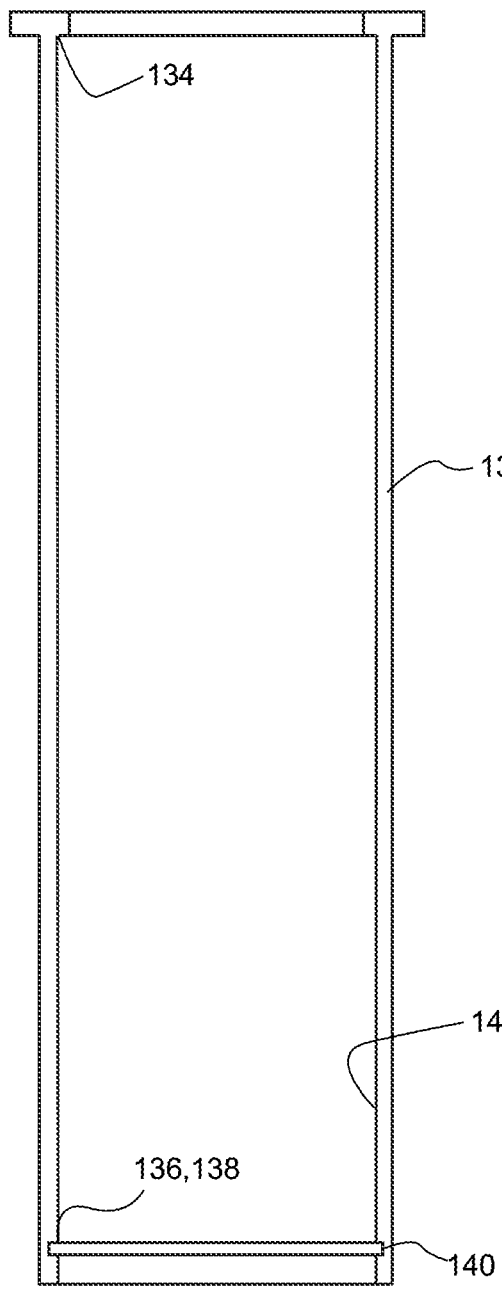
FIG. 18 is a side elevation section view of the cam liner of the wind mill of FIG. 1.
Figure 19:
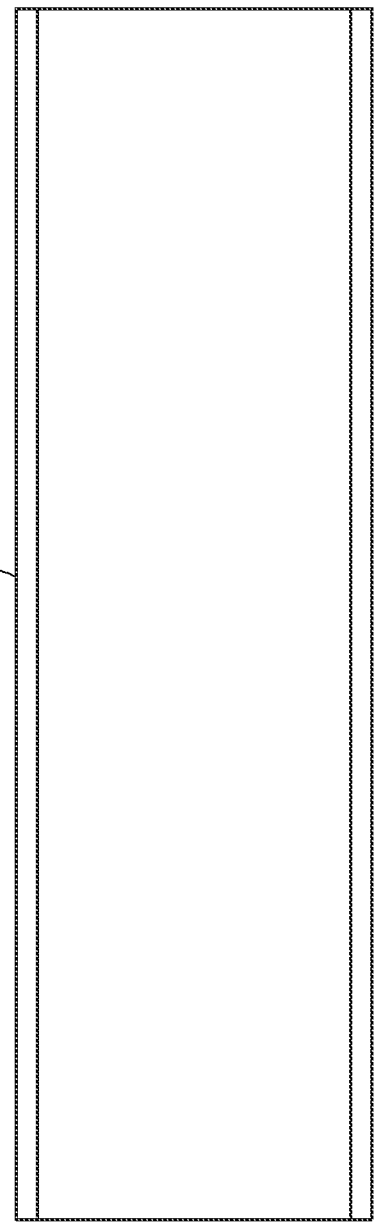
FIG. 19 is a side elevation section view of the bearing liner of the wind mill of FIG. 1.

Lift from lift assembly 114 may be transmitted to collar 68 as follows (FIGS. 2, 4A, 16-19). Lift plate 126 supports a bearing 128, upon which a flanged liner 130 sits (FIGS. 2, 4A, 16-17). Flanged liner 130 supports a bearing liner 132, such as a teflon liner (FIGS. 2, 4A). Flanged liner 130 supports liner 132 between upper and lower axial facing shoulders 134 and 136 (FIGS. 4A, 18-19). Like shaft 14, one or more of shoulders 134 and 136 may be defined by a retainer ring 138 fitted within an annular slot 140 in the inner surface 142 of mast liner 130. Bearing liner 132 allows relative rotation between collar 68 and shaft 14. Flanged liner 130 extends axially through collar 68 where a fluid guidance 144 is connected to liner 130. Guidance 144, which may include a wind fin 146, is connected to provide rudder control by rotating the collar 68 relative to the frame 12 to orient the apparatus 10 into the fluid flow direction (FIG. 1). Guidance 144 connects to flanged liner 130 via a bracket 148 sized to support an underside 150 of collar 68, so that lift through guidance 144 is transmitted to collar 68 (FIGS. 1, 2, and 4A). An alignment plate 152 mounts upon collar 68 to ensure that collar 68 is properly offset from shaft axis 20. Thus, at low rotational speeds, weights 116 do not act to generate sufficient lift to axially displace collar 68 from the first configuration, and thus followers 70 follow surface 72 (FIG. 4A). However, at high rotational speeds, weights 116 generate lift that is transmitted to axially displace collar 68 relative to followers 70, and as a result followers 70 follow surface 74 (FIG. 4B). The first outer circumferential surface 72 and the second outer circumferential surface 74 may be connected by a smooth surface 154 transitioning between surfaces 72 and 74, to reduce vibration and jarring impacts when switching configurations, and to decrease the amount of camming and hence vane pitching proportionally with increasing wind speed.

Although described above primarily for wind driven applications, apparatus 10 is not limited to wind drive, but may be connected to be driven by any suitable type of fluid, such as gas, liquid, and solids in some cases. When driven, apparatus 10 may be connected to transfer rotational shaft energy into other forms of energy, for example electricity via a generator (not shown). Other suitable applications may be used. As well, apparatus 10 is not limited to be driven by fluid, but may itself drive fluid flow, for example if arranged as a boat propelling system. Shaft axis 20 need not be vertical, but may assume other suitable orientations, such as an angle not parallel with fluid flow direction 58. Pitch adjustment axis 54 may be angled with respect to the wind flow direction 58. Components that are mounted or connected together may be connected via suitable mechanisms, such as magnets, bolts, welds, adhesive, and friction fits. The first and second rotational speeds may be ranges of speeds. Each component may include a combination of more than one component, for example shaft 14 is shown as a combination of different shafts and pieces secured to rotate together. Frame 12 may be anchored on a moving or stationary surface relative to the earth. Use of directional terms such as up and down, lower, top, and bottom are relative terms and are not intended to be defined only in relation to vertical and horizontal axes.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property of privilege is claimed are defined as follows:

1. An apparatus comprising:
    a frame;
    a shaft mounted to the frame for rotation;
        plural vanes each mounted for rotation about a respective pitch adjustment axis on one or more respective arms extending from the shaft;
        a collar mounted to the frame coaxial with the shaft, the collar having a first outer circumferential surface that forms a circumferentially convex cam in cross-section, and a second outer circumferential surface that forms a circle co-axial with the shaft; and
    plural followers arranged to contact the first outer circumferential surface in a first configuration corresponding to a first speed of rotation of the shaft and the second outer circumferential surface in a second configuration corresponding to a second speed of rotation of the shaft, the second speed being higher than the first speed, the plural followers being each connected to adjust the pitch of a respective vane of the plural vanes.

2. The apparatus of claim 1 in which the plural followers comprise rollers.

3. The apparatus of claim 1 further comprising a fluid guidance connected to rotate the collar to orient the apparatus into a fluid flow direction.

4. The apparatus of claim 1 in which the circumferentially convex cam formed by the first outer circumferential surface defines a circular arc and an elliptical arc.

5. The apparatus of claim 4 in which the circular arc and the elliptical arc meet at a pair of points, and at each point of the pair of points the circular arc and elliptical arc define identical respective tangents.

6. The apparatus of claim 1 in which the circumferentially convex cam is an ellipse.

7. The apparatus of claim 6 in which a shaft rotational axis is offset from an ellipse center along a major semi axis defined by the ellipse, the major semi axis being longer than a diameter of the second outer circumferential surface.

8. The apparatus of claim 7 in which a minor semi axis defined by the ellipse is equal to or longer than the diameter of the second outer circumferential surface, and a radius of the first outer circumferential surface along the major semi axis is equal to a radius of the second outer circumferential surface.

9. The apparatus of claim 1 in which the second outer circumferential surface has a smaller radius than an average radius of the first outer circumferential surface.

10. The apparatus of claim 1 further comprising a device for axially displacing the collar relative to the plural followers to switch between the first configuration and the second configuration.

11. The apparatus of claim 10 in which the first outer circumferential surface is above the second outer circumferential surface, and in which the controller further comprises one or more weights connected to raise the collar by centrifugal force when the shaft achieves the second speed of rotation.

12. The apparatus of claim 1 in which the first outer circumferential surface and the second outer circumferential surface are connected by a smooth surface transitioning between the first outer circumferential surface and the second outer circumferential surface.

13. The apparatus of claim 1 in which:
each vane of the plural vanes is moveable into and out of a neutral pitch, where an angle of attack of the vane is perpendicular to a direction of rotation of the vane about the frame; and
the collar is shaped such that, when in the first configuration, each vane is out of neutral pitch for a portion of a full rotation of the shaft about the frame, and when in the second configuration all of the plural vanes are in neutral pitch.

* * * * *